United States Patent
Bilak et al.

(10) Patent No.: US 6,170,667 B1
(45) Date of Patent: *Jan. 9, 2001

(54) APPARATUS AND METHOD FOR PREPARATION OF LIQUID/SOLID SLURRIES

(75) Inventors: Roman Anthony Bilak, Calgary; Darcey Dale Fundytus, Innisfree, both of (CA)

(73) Assignees: Terralog Technologies U.S.A. Inc.; Terralog Technologies Inc. (CA)

( * ) Notice: Under 35 U.S.C. 154(b), the term of this patent shall be extended for 0 days.

This patent is subject to a terminal disclaimer.

(21) Appl. No.: 09/021,269

(22) Filed: Feb. 10, 1998

Related U.S. Application Data

(63) Continuation-in-part of application No. 08/919,070, filed on Aug. 22, 1997.

(51) Int. Cl.$^7$ ............... B03B 5/00; B65G 33/00
(52) U.S. Cl. ............... 209/3; 209/10; 209/315; 209/913; 198/670
(58) Field of Search ............... 209/3, 10, 311, 209/315, 913; 198/657, 670

(56) References Cited

U.S. PATENT DOCUMENTS

| | | | |
|---|---|---|---|
| 4,173,530 | * 11/1979 | Smith et al. | 209/11 X |
| 4,430,210 | * 2/1984 | Tuuha | 209/315 X |
| 4,479,048 | * 10/1984 | Kinoshita | 209/913 X |
| 5,133,624 | 7/1992 | Cahill | 405/128 |
| 5,277,758 | * 1/1994 | Brooks et al. | 209/3 X |
| 5,318,382 | 6/1994 | Cahill | 405/128 |
| 5,476,550 | * 12/1995 | Walker | 198/670 |
| 5,868,256 | * 2/1999 | Teppo | 209/913 X |

FOREIGN PATENT DOCUMENTS

2619025 * 2/1989 (FR) ................ 209/10

* cited by examiner

Primary Examiner—Tuan N. Nguyen
(74) Attorney, Agent, or Firm—McFadden, Fincham

(57) ABSTRACT

An apparatus and method are disclosed for the continuous formation of slurry. The apparatus includes a hopper to receive particulate material; one or more transport/mixing assemblies that mix and transport the solid material and a carrier liquid; and a mixing/averaging tank that receives the solid/liquid mixture from the transport/mixing assembly and performs a final mixing and averaging of the mixture to achieve a desired slurry consistency. An auger inside the tank continuously mixes and shears the slurry. The tank has one or more outlet ports to continuously discharge the slurry. The auger may be bi-directional, to direct the slurry towards dual outlets on opposing ends of the tank. Preferably, a reciprocating screen deck is provided to eliminate oversized particulates before the mixture enters the mixing/averaging tank. Carrier liquid is introduced at several points in the process, including into the transport/mixing assemblies, at the screen deck, and into the mixing/averaging tank. The transport mixing/assemblies may consist of an auger housed within a tubular housing, with rotation of the auger serving both to mix the solids and liquid and to transport the mixture through the assembly. The transport/mixing assemblies may consist of a stepwise array of auger stages with the respective auger housings interconnecting to permit material to be transported from one end of the assembly to the other. Alternatively, the assembly may employ a high-pressure jet of carrier liquid that both combines with the solid particulates and propels the mixture through a housing.

34 Claims, 10 Drawing Sheets

APPARATUS AND METHOD FOR PREPARATION OF LIQUID/SOLID SLURRIES

This is a continuation-in-part of the applicants' co-pending application Ser. No. 08/919,070, filed Aug. 22, 1997.

FIELD OF THE INVENTION

The invention relates to an apparatus and method for the preparation of slurries from mixtures of liquids and solids. The invention is particularly intended for the preparation of slurries that incorporate waste materials, for injection into geological formations. The invention may also be adapted for the preparation of other types of slurries, for other uses.

BACKGROUND OF THE INVENTION

Slurries comprised of suspensions of solids within a liquid carrier, with or without the presence of other liquids such as waste oils, are prepared for a variety of applications that require a continuous slurry formation process. The present applicant's co-pending application Ser. No. 08/713,358 relates to an apparatus and method for the disposal of wastes by injection of wastes in slurry form into geological formations. The slurry is prepared on the surface for this application with apparatus designed to produce a generally continuous stream of slurry. Typical wastes that may be slurrified for this process include:

oily sand from petroleum industry operations, as well as waste drilling fluids and drill chips from well drilling operations and oily slop and sand and residues from tank-bottom clean-outs;

soil contaminated with toxic materials such as PCB, heavy metals, cyanide compounds, hydrocarbons, naturally-occurring radioactive wastes, etc.;

dredging wastes;

municipal sewage sludge from which the organic wastes have been largely decomposed;

waste plastics, glass, and other solid materials;

fly ash, clinker or other residue from combustion of wood, coal or municipal wastes;

flue gas desulphurization sludges as well as recaptured particulates from smoke or emission abatement processes, whether in solid or aqueous suspension form;

high solids content sludges and residues from petroleum refining, including high ash content coke, heavy oil residues and removed solids.

Typical existing slurry-making systems employ a batch processing method, wherein slurry is generated and discharged in a series of discrete batches. This approach is not desirable for generating the high volumes of slurry that is preferred for subterranean injection applications, nor does it permit an injection pump to operate on a continuous basis. The continuous production of a steady stream of slurry is important to achieve optimal pump efficiency and to minimize pump wear.

As well, apparatus for producing slurry for use in an injection process as described in co-pending application Ser. No. 08/713,358 must meet several design criteria in order to dispose of a substantial volume of wastes at a high rate:

delivering prepared slurry on a continuous basis at a surface pressure of between 6–15 Mpa;

disposition of slurry injected at a rate of between 1.5 and 2.0 m$^3$/min. and 1000 m$^3$/day;

slurry composition with a granular solids content between 15–40% and real-time waste concentration and slurry density control to maintain density between 1100 and 1500 kg/m$^3$;

processing of 200–400 m$^3$/day of granular wastes;

ability to accept a variety of solid materials, including slop and sand.

The operating parameters of a slurry forming apparatus for use in a waste injection system require equipment capable of preparing a relatively granular, highly viscous slurry at relatively high rates and pressures and on a continuous basis. Preferably, the slurry formation apparatus for this application should provide the following features:

a) relative ease of handling of waste material;

b) screening of granular waste material on a continuous basis to remove oversize or undesirable material;

c) a real-time monitoring apparatus to monitor and record injection parameters;

d) variable speed controls linked to the monitoring apparatus to control the various slurry-forming components and maintain consistent slurry quality and delivery rate;

e) a system capable of relatively rapid set-up and disassembly;

f) slurry formation equipment capable of shearing highly viscous material to increase slurry mobility and injectivity, maintaining slurry consistency within a relatively small range, and being capable of handling relatively large amounts of waste material, in the range of at least 100 m$^3$/day, which when incorporated within a slurry may result in the formation of 1,500 m$^3$/day slurry or more.

A further requirement of an apparatus designed to process sand or other abrasive materials is that the moving parts not be exposed to excess wear. This requirement particularly affects the material transport means within the system, which are in contact with the slurry or slurry substrate. These components should minimize the use of moving parts in contact with each other that are also in contact with the slurry mixture. As well, where the system is intended to provide slurry to a waste injection system, it is desirable to provide a dual slurry outlet, in order to permit the use of dual injection pumps to reduce wear on the individual pumps and minimize maintenance downtime of the system.

SUMMARY OF THE INVENTION

In light of the objectives outlined above, the present invention consists of an apparatus for the formation of a slurry having a predetermined consistency, on a generally continuous basis, by combining a carrier liquid, solids in granular form and optionally other liquids and solids. The apparatus achieves a continuous slurry formation by means of continuously performing one or more preliminary mixing operations of a carrier liquid and solid particulates prior to entry of the mixture into a main mixing tank wherein the particulates are mixed with a carrier liquid. This preliminary mixing stage permits the main mixing tank to perform the final steps of mixing, shearing and averaging, or adjusting of the slurry consistency. These functions may be performed on a generally continuous basis within a mixing/averaging tank that incorporates an effective shearing and mixing means.

In its broadest aspect, the apparatus consists of:

a) receiving means to receive solids in particulate form;

b) a transport/mixing assembly having an opening at a first end to receive material from the receiving means, at least one inlet to receive carrier liquid into the assembly, and transport/mixing means to continuously combine the solid material with the carrier liquid while transporting the mixture from the first end to a second end of the assembly;

c) a mixing/averaging tank adapted to receive the solid/liquid mixture from the transport/mixing assembly to perform a final mixing and averaging of the mixture to achieve a desired slurry consistency, and to discharge the finished slurry on a continuous basis.

The mixing/averaging tank is provided with one or more inlet means to direct additional carrier liquid into the slurry mixture. The inlet means may comprise a sprayer positioned to spray liquid at the surface of the slurry within the tank. The tank is provided as well with mixing and shearing means such as one or more augers to continuously mix and shear the slurry, and one or more outlet ports at the base of the tank to discharge the slurry.

The liquid inlet for introducing carrier liquid into the transport/mixing assembly comprises a separate inlet from the receiving means for receiving particulates. This permits the liquid to be introduced separately from and subsequent to the introduction of particulates. The liquid intake into the slurry mixing tank preferably also comprises a separate inlet from the inlet for receiving slurry particulates. This arrangement permits an efficient formation of slurry.

Preferably there is further provided particulate sizing means to eliminate oversized particles before the mixture enters the mixing/averaging tank. The sizing means may comprise a screen deck with single or multiple spaced apart screen layers, with means to shake or vibrate the screen deck to perform a screening operation. A stream of carrier liquid may be directed at the upper surface of the screen deck and/or between the spaced apart screen layers to introduce additional liquid to the mixture and assist in the screening operation. In one version, the sizing means receives the particulate/liquid mixture from a second end of a first transport/mixing assembly, with a second transport/mixing assembly being provided to transport the screened mixture from the sizing means to the mixing/averaging tank. In another version, particulates are carried to the sizing means by a conveyor. A transport/mixing assembly carries the particulate/water mixture from the sizing means to the mixing/averaging tank.

Each of the transport mixing/assemblies may comprise at least one auger housed within a tubular housing, with an inlet into the housing to permit the entry of carrier liquid. Rotation of the auger serves both to mix the solids and liquid and to transport the mixture from the first to the second end of the assembly. The assembly may also comprise a multiple auger assembly, consisting of a stepwise array of auger stages. Each stage consists of an auger housed within a tubular housing. The housings interconnect to permit material to be transported from one end of the assembly to the other. At least one of the auger housings has an inlet for the entry of carrier liquid. The use of multiple auger stages permits the auger assembly to have a relatively long span, while maintaining a relatively short individual auger length. This permits the individual augers to be supported solely at their ends, without the requirement of additional support of the auger by means of a wear-prone mid-auger bushing or bearing arrangement.

In another aspect of the invention, one or more of the augers within the transport/mixing assemblies may be comprised of first and second portions, with the first portion facing the intake end of the auger and the second portion facing the output end. The first portion of the auger is characterized by a double flighting and the second portion is characterized by a single flighting. The double flighting at the first portion transports the relatively granular particulate mixture with increased efficiency from the intake end of the assembly, while the single flighting is better adapted to transport the more liquid mixture that results as water is added to the mixture.

Alternatively, the assembly comprises a generally tubular housing with means to transport the particles within a jet of fluid. The fluid may comprise the carrier liquid, which combines with the particles within the housing to form a preliminary slurry mixture.

The slurry output conduit or conduits leading from the mixing/averaging tank may be linked to single or dual pressurizing pumps to generate a pressurized stream of slurry for deep-well injection.

In another aspect of the invention, the mixing/averaging means within the mixing/averaging tank consists of a bi-directional auger rotatably mounted near the base of the tank. The auger flightings are canted in opposing directions on either side of the midpoint of the auger, permitting the auger when rotated to direct the slurry within the tank towards opposing ends of the tank. This permits the slurry to be withdrawn from the tank through dual outlets at either side of the tank, to be pressurized within dual pressurizing pumps for subsurface injection. The pump outputs are later combined for subsurface injection within a well. The use of dual injection pumps minimizes system downtime for pump maintenance and permits the individual pumps to operate at lower rate to minimize wear.

In a further aspect, the mixing/averaging means may comprise a conventional unidirectional auger, that directs the slurry to a single outlet at one side of the tank.

The invention further comprises a method for the formation of a slurry, using the apparatus described above. In its broadest aspect, the method consists of the following steps:

a) delivering solid material in particulate form to a mixing/transport assembly of the type described above;

b) adding a carrier liquid to the material within the mixing/transport assembly;

c) performing a preliminary mixing of the solids and liquid within the mixing/transport assembly, while transporting the resulting mixture to a mixing/averaging tank;

d) delivering additional carrier liquid into the tank and mixing and shearing the mixture within the tank;

e) removing the slurry from the tank on a generally continuous basis.

The method may include the further steps of delivering the mixture from a first mixing/transport assembly to a particle sizing means comprising a screen deck engaged to a motor-driven shaker to shake the screen deck; shaking the mixture through the screen deck to remove oversized particles; delivering additional carrier liquid to the mixture at the screen deck; and delivering the mixture from the particle sizing means to the mixing/averaging tank through a second mixing/transport assembly. The screen deck may comprise multiple spaced-apart screen layers, with carrier liquid being sprayed onto the mixture onto the deck and/or between the screen layers. Additional carrier liquid may be added to the mixture within the mixing/averaging tank. This may be accomplished by spraying additional liquid onto the surface of the slurry within the tank and/or introducing liquid through a port within the tank. The mixture may alternatively be carried to the particle sizing means by a conveyor and delivered to the mixing/averaging tank through a mixing transport assembly.

DETAILED DESCRIPTION OF THE PREFERRED EMBODIMENT

Figure 1:
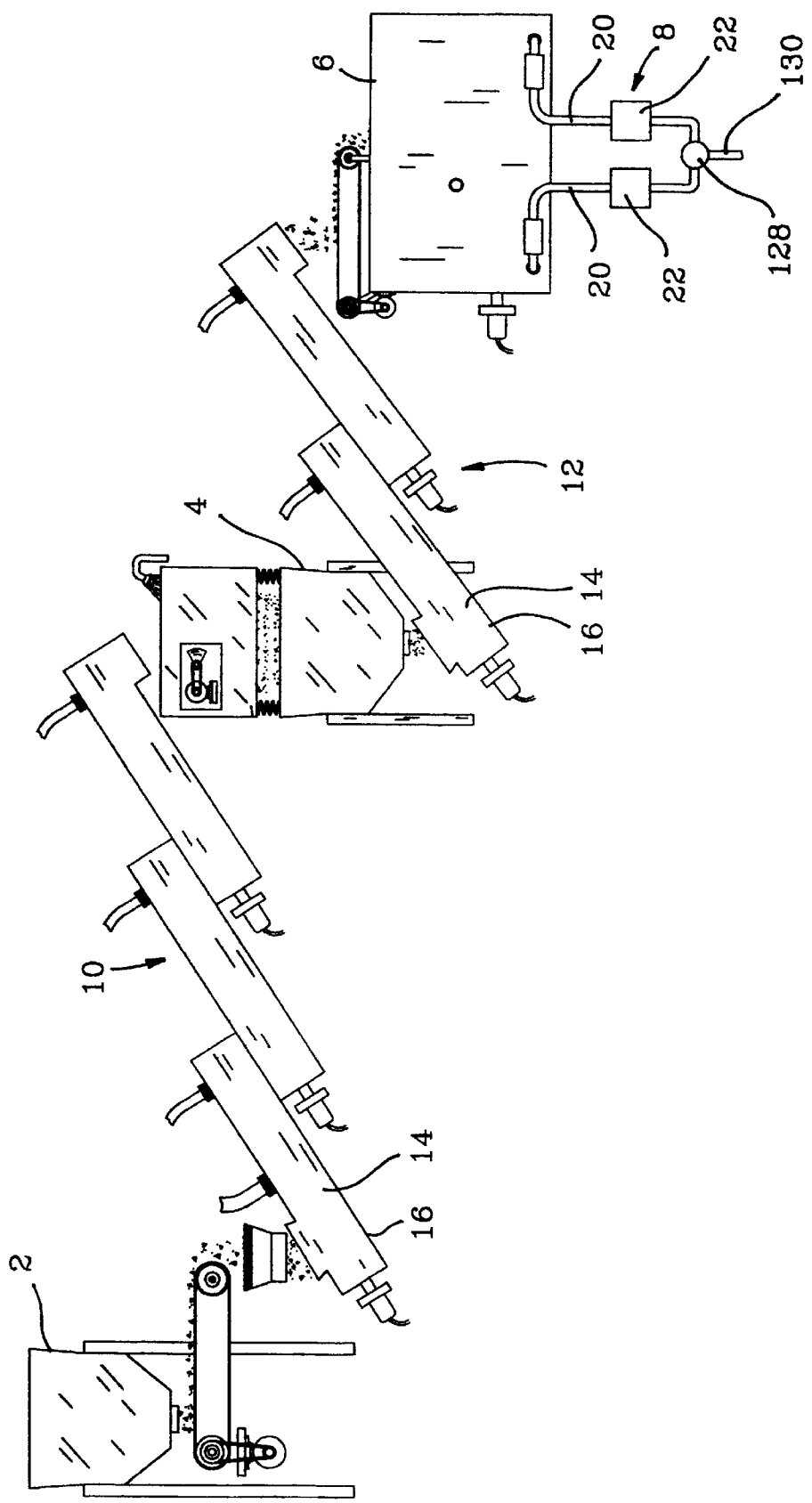
FIG. 1 is a schematic view of the slurry-forming apparatus according to the present invention, with internal components being shown by broken lines.

Referring to FIG. 1, the slurry formation apparatus incorporates a hopper 2, a particle sizing apparatus 4 and a mixing/averaging tank 6. The slurry output from the apparatus may lead to an injection pump apparatus 8 for injection of the slurry into a well (not shown). A first elongate mixing/transport assembly 10 transports particulate material from the hopper to the sizing apparatus, and a second mixing/transport assembly 12 transports the mixture to the mixing/averaging tank. Each of the mixing/transport assemblies comprises a multi-staged auger assembly that consists of an array of auger units 14. Each auger unit comprises an auger housed within a corresponding tubular housing 16. The housings are arranged in an interconnecting stepwise array. A water source (not shown) delivers a steady high-pressure (approx. 200 psi) source of water. From the mixing-averaging tank, dual pipes 20 transport the slurry to corresponding dual slurry pressurizing pumps 22. The water supply tank is linked by hoses (not shown) to the various liquid inlet ports in the apparatus.

Figure 2:
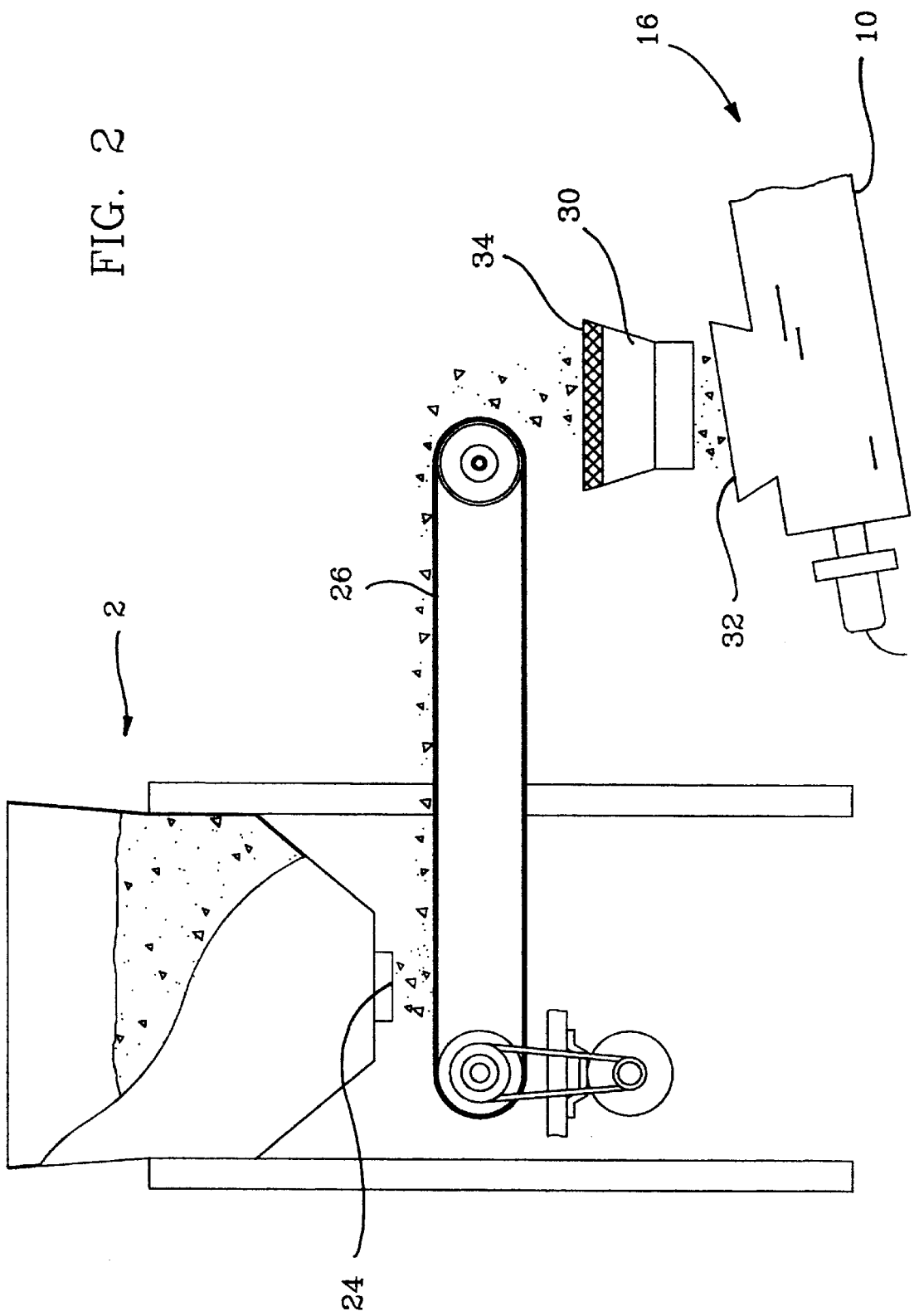
FIG. 2 is a sectional view of the particulate-receiving hopper.

Referring to FIG. 2, the hopper 2 has an open top to receive solid material in particulate form. Various particulate materials, including sand, may be deposited in the hopper, as well as combinations of particulates and viscous liquids or liquid mixtures such as sludge-bearing sand or the like. The hopper of the preferred embodiment is designed to receive a load of between 8 and 20 cubic meters of sand or similar granular material. Material exits the hopper at a controlled rate through a variable-sized aperture 24 at the base of the hopper. A conveyor 26 transports the particulates from the hopper to a receiving cone 30 that funnels the particulates into a mouth 32 at a first end of the first mixing/transport assembly. A grating 34 over the receiving cone screens oversized material.

Figure 3:
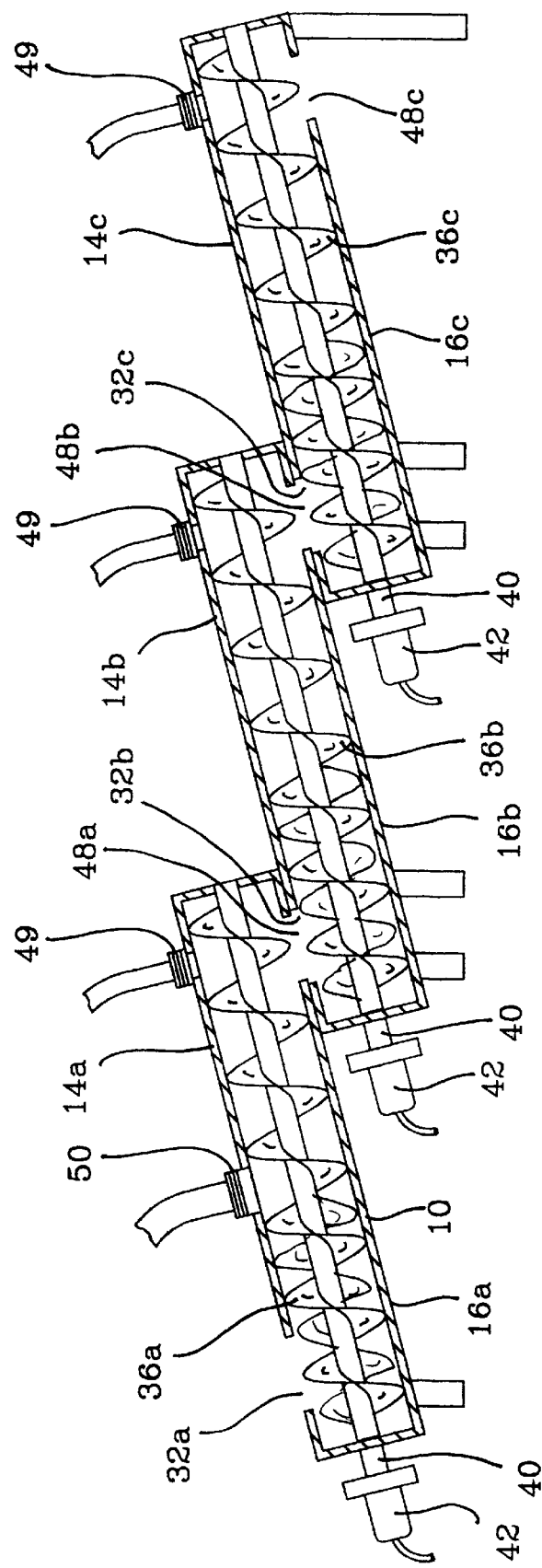
FIG. 3 is a sectional view of a transport/mixing assembly.
Figure 8:
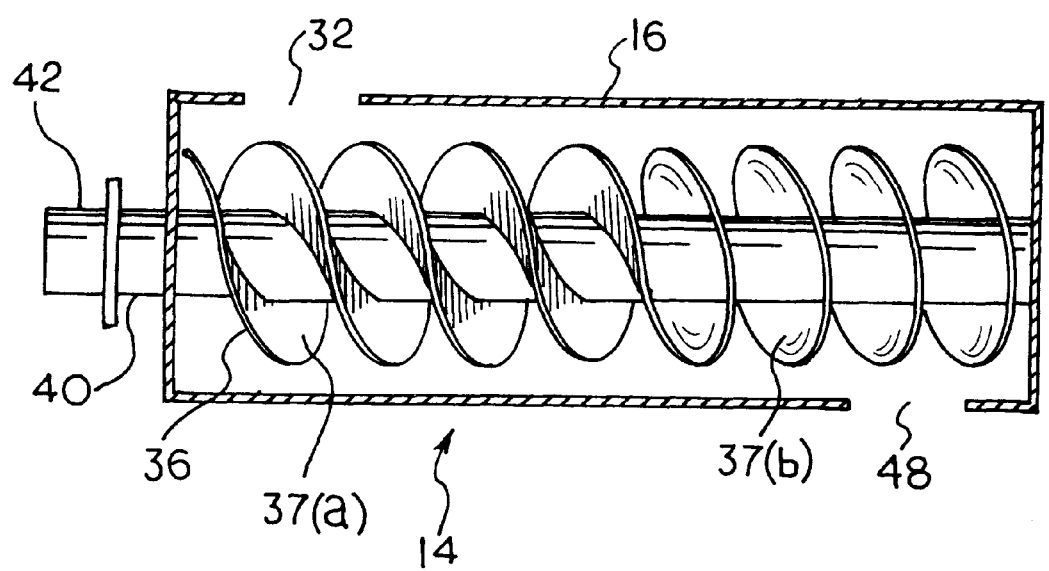
FIG. 8 is a side elevational view of an auger for use within the mixing/transport assembly.

Turning to FIG. 3, the first mixing/transport assembly consists of a three-stage auger assembly, comprising a series of three individual auger stages 14(a), (b) and (c). It will be understood that fewer or more stages may be used, depending on the desired configuration. The auger stages angle upwardly in a stepwise arrangement from the receiving end to the discharge end of the assembly. Each auger stage, seen more particularly in FIG. 8, comprises an auger 36(a), (b) or (c) housed within a corresponding tubular auger housing 16(a)–(c). Each auger is journalled at either end within a bushing or bearing arrangement. Each auger 36(a)–(c) consists of first and second portions 37(a) and (b), with the first portion facing the receiving end and the second portion facing the discharge end. The first portion 37(a) of each auger is characterized by a double flighting and the second portion is characterized by a single flighting, as shown in detail in FIG. 8. The double flighting at the first portion permits the auger to more effectively mix together the particulates and carrier liquid, while the single flighting at the upper end permits the auger to more efficiently transport the resulting mixture to the end of the auger stage. One end of each auger has a shaft 40 extending from the end of the housing, rotatably linked to and driven by a hydraulic motor 42. The auger housings 16 are characterized by a mouth 32 at their intake ends and and a second opening 48 at their discharge ends. The mouth 32 and second openings 48 of adjoining housings communicate.

Each auger housing 38 has a water inlet 49 at its upper end to permit carrier liquid to be introduced into each auger stage. The first auger stage 14(a) has an inlet port 50 to receive additional non-solid material for incorporation into the slurry, such as viscous oils and the like.

The second mixing/transport assembly is similar to the first assembly.

Figure 4:
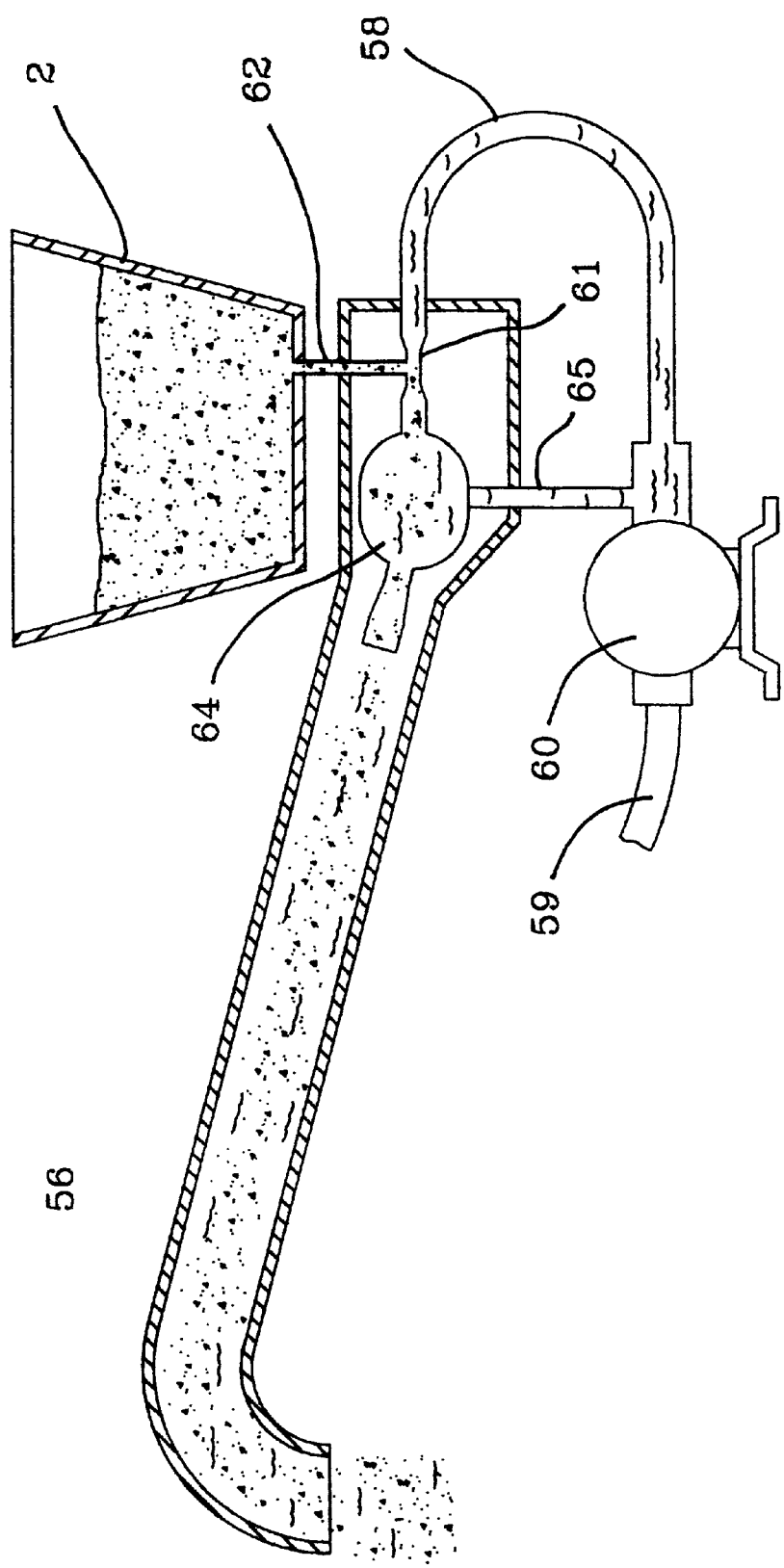
FIG. 4 is a schematic side sectional view of a second embodiment of the transport/mixing assembly.

An alternative embodiment of the mixing/transport assembly is illustrated in FIG. 4. In this version, the motive power for transporting particulates through the assembly comprises a jet of carrier fluid. The assembly comprises an elongate tubular conduit, with means to deliver a high-pressure mixture of carrier fluid and particulates with sufficient velocity to carry the mixture the length of the conduit. The tubular conduit 56 angles upwardly from its base to its discharge end, which terminates at the sizing apparatus 4 (not shown in this drawing). A pressurized carrier fluid stream is delivered to the assembly via a conduit 58, and is pressurized before delivery by means of a compressor or pump 60. The carrier fluid enters the compressor or pump through inlet 59. The conduit 58 has a narrowed region 61, with a secondary inlet 62 entering the conduit 58 at the narrowed portion. The narrowing of the channel results in a Bernoulli effect that draws particulate material from the hopper 2, through a secondary inlet 62, into the narrowed portion, where the particulates become entrained within the carrier fluid. The pressurized stream, bearing the entrained particulates, enters a preliminary mixing chamber 64, which also receives a secondary high-pressure fluid stream from the compressor 60 through a secondary conduit 65. The preliminary mixing chamber combines the particulates and the secondary carrier fluid into a generally uniform mixture and discharges the mixture into the conduit 56 with sufficient velocity to carry the mixture up the length of the conduit. The carrier fluid may comprise a liquid which when combined with the particles within the assembly generates a preliminary slurry mixture.

Figure 9:
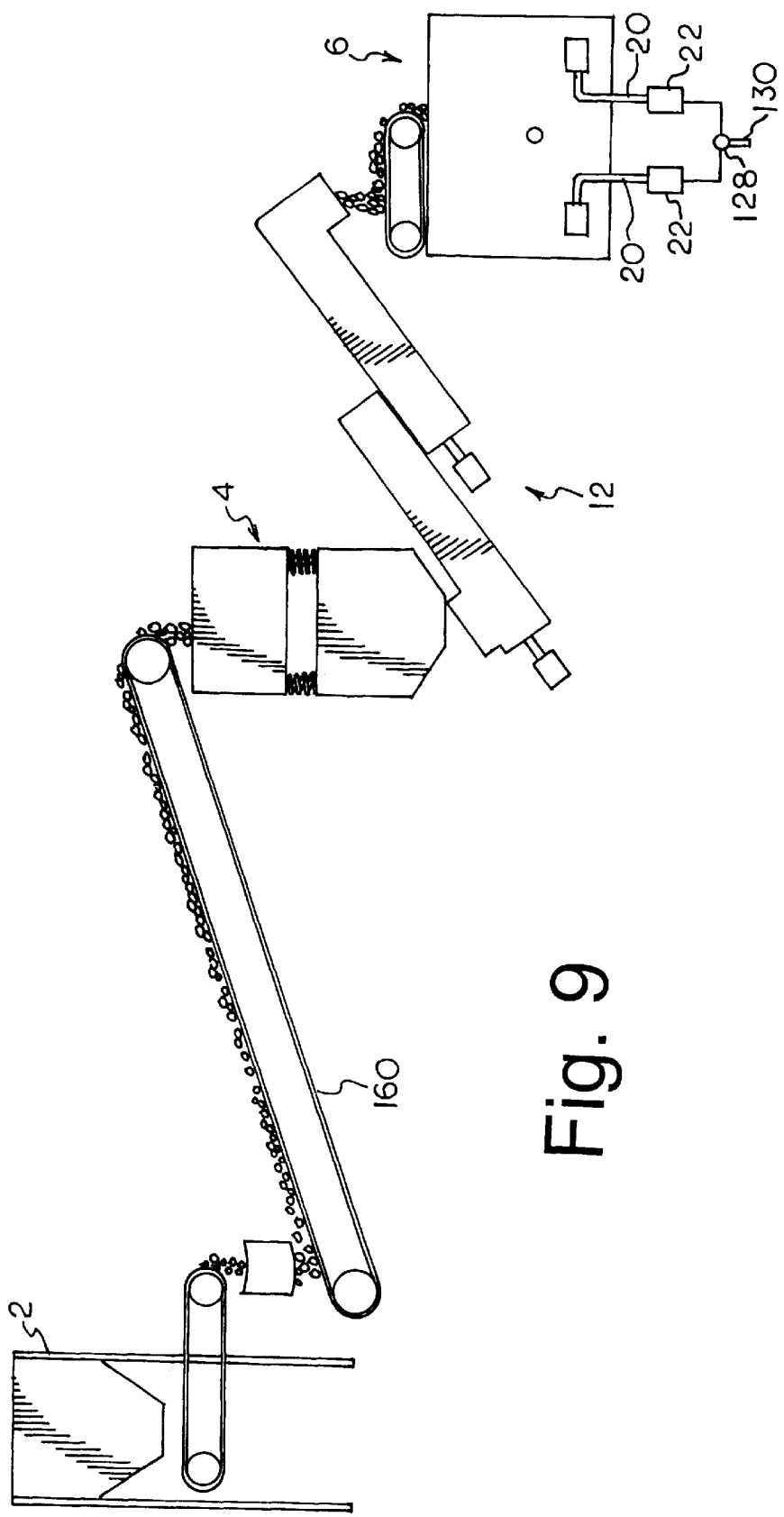
FIG. 9 is a schematic view of a further embodiment the slurry-forming apparatus, with internal components being shown by broken lines.

In an alternative embodiment, seen in FIG. 9, only a single mixing/transport assembly is provided, with the first mixing transport assembly being replaced by a conveyor 160. In this embodiment, the conveyor 160 receives particulates from the hopper 2 and transports them to the sizing apparatus 4. Within the sizing apparatus, water is introduced to the particulates as described below and oversized particles are separated from the mixture. The screened particulates, combined with water within the sizing apparatus, are transported to the mixing/averaging tank 6 by means of the transport/mixing assembly 12 as described above.

Figure 5:
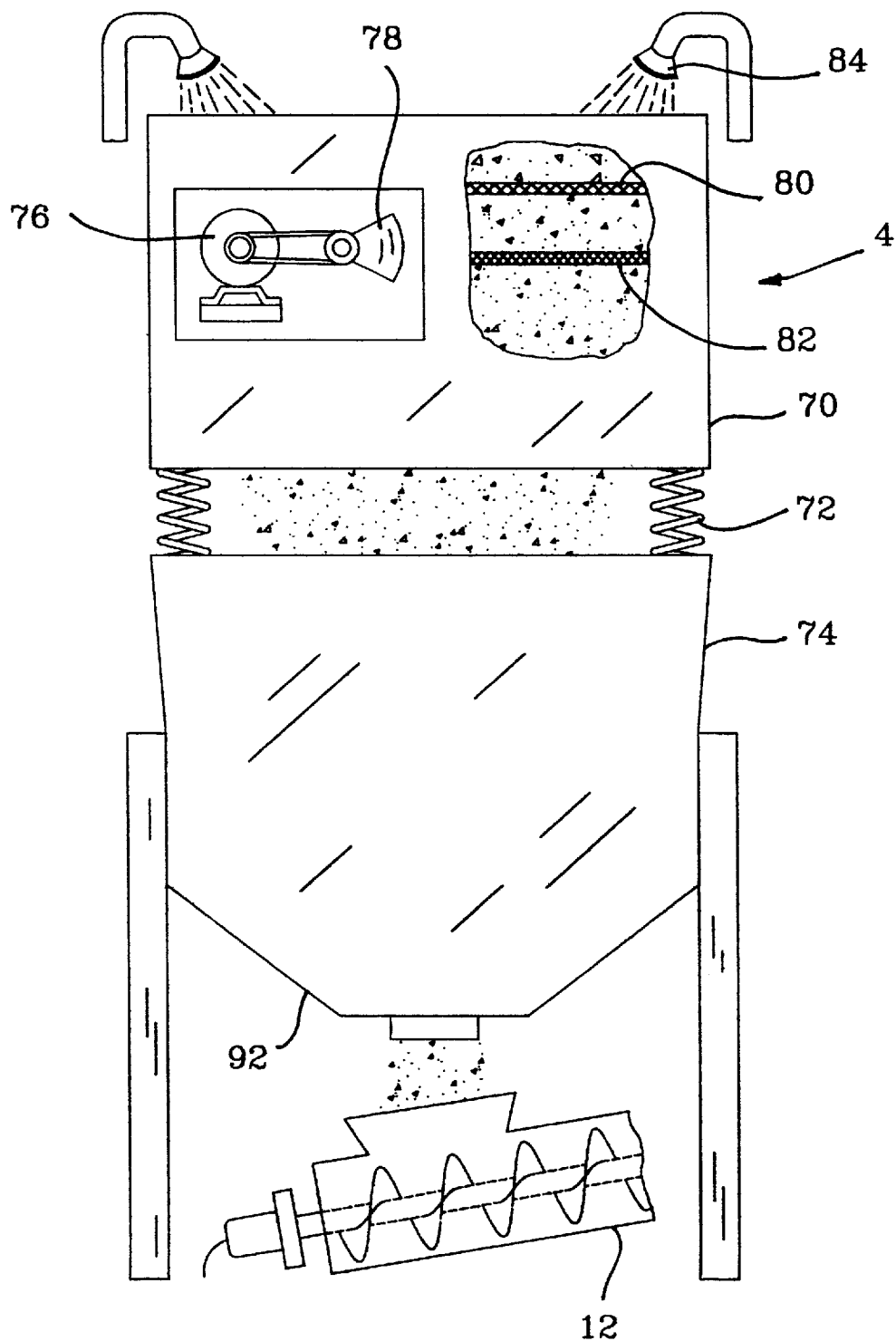
FIG. 5 is a side elevational view, partly cut-away, of the sizing means.

The sizing apparatus 4, seen in detail in FIG. 5, comprises a screening means to screen out oversized particles. The apparatus consists of a rectangular screen housing 70 having an open top and bottom, mounted on coil springs 72 over a hopper 74. A motion generator means, comprising a hydraulic motor 76, is mounted to the housing. The motor drives an eccentric cam 78, which when rotated causes the screen housing to vibrate and shake. Upper and lower spaced apart, generally horizontal screen decks 80 and 82 extend across the housing, with the particulates being deposited from the first transport/mixing assembly onto the upper screen deck 80. The individual screens within the deck are adjustable and removable to optimize slurry composition for particular injection conditions. Typically, the upper deck has a coarser mesh than the lower deck. A water sprayer consisting of an array of high-pressure spray bars 84 is positioned to direct high-pressure streams of water at the particulate mixture on the upper surface of the upper deck 80 and between the decks 80 and 82 as the mixture sifts through the decks. The action of the spray jet and the shaking of the screens serves to remove particles having a size greater than about 0.25 to 1 cm. from the waste stream. The introduction of water further assists the slurrification process. The screens are replaceable in order to change slurry composition through the use of different mesh sizes in the screens. The oversized particles are either crushed by a stand-alone crusher (not shown), to be fed back into the waste stream, or are collected and disposed of by other means.

The screened material falls from the screen deck into the hopper 74. An opening 92 at the base of the hopper 74 funnels the slurry into the second mixing/transport assembly 12, comprising the same elements as the first mixing/transport assembly 10. The slurry is then transported to the slurry mixing/averaging tank 6, seen in detail in FIG. 6. The tank has an open top to receive the particulate/liquid mixture. A short horizonal conveyor or auger 96 receives the mixture from the second mixing/transport assembly and transports it partway across the tank 6. The tank has generally straight sides and a trough-shaped bottom portion 102, with single or side-by-side multiple mixing augers 100 rotatably mounted within the bottom portion 102. The mixing augers serve to mix and shear the slurry within the tank. An auger shaft 104 from each auger 100 extends through the wall of the tank and is rotatably driven by a hydraulic motor 106. The mixing augers are bi-directional, with the flightings on either side of the midpoint of the mixing auger being canted in opposing directions to direct the slurry towards opposing sides of the tank. A water spray bar surrounds at least part of the upper rim of the tank and sprays additional carrier liquid onto the slurry. Additional liquid may be added to the tank to adjust the slurry consistency through an inlet port 108. Other additives may also be added directly into the tank 6 through the inlet port, if required.

Figure 6:
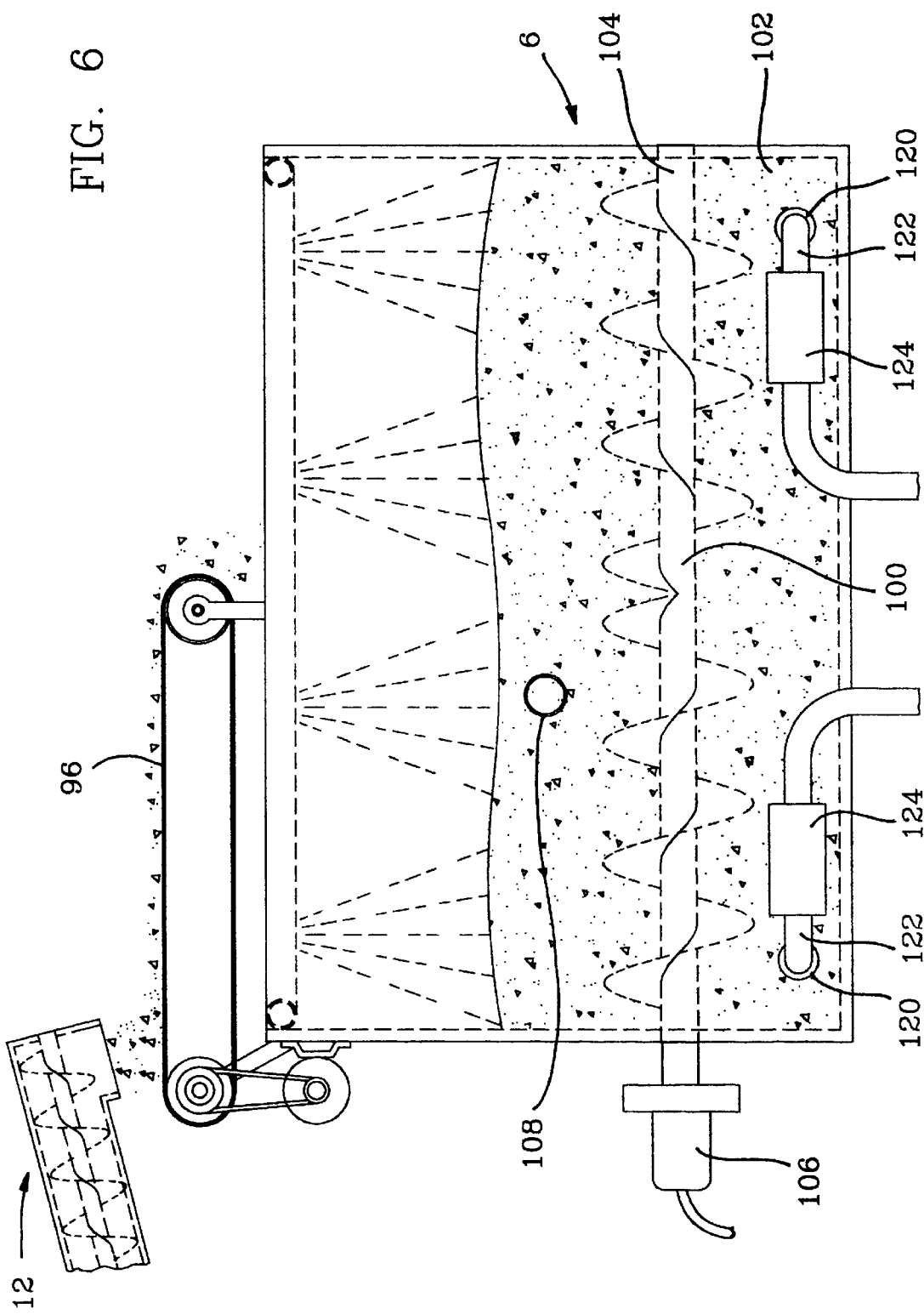
FIG. 6 is a sectional view of the mixing/averaging tank showing the bi-directional mixing auger within the base of the tank.

Dual outlets 120 lead from of the base of the slurry averaging tank adjacent each end thereof. As seen in FIGS. 1 and 6, from each outlet a conduit 122 directs the slurry through a booster pump 124 into one of two injection pumps 22 (seen in FIG. 1), each of which pressurizes the slurry sufficiently to permit the slurry to be injected into a well (not shown) extending deep into a geological formation. The injection pumps separately discharge into a combiner 128 that combines the streams from the two pumps into a single discharge pipe 130 into the well.

Figure 10:
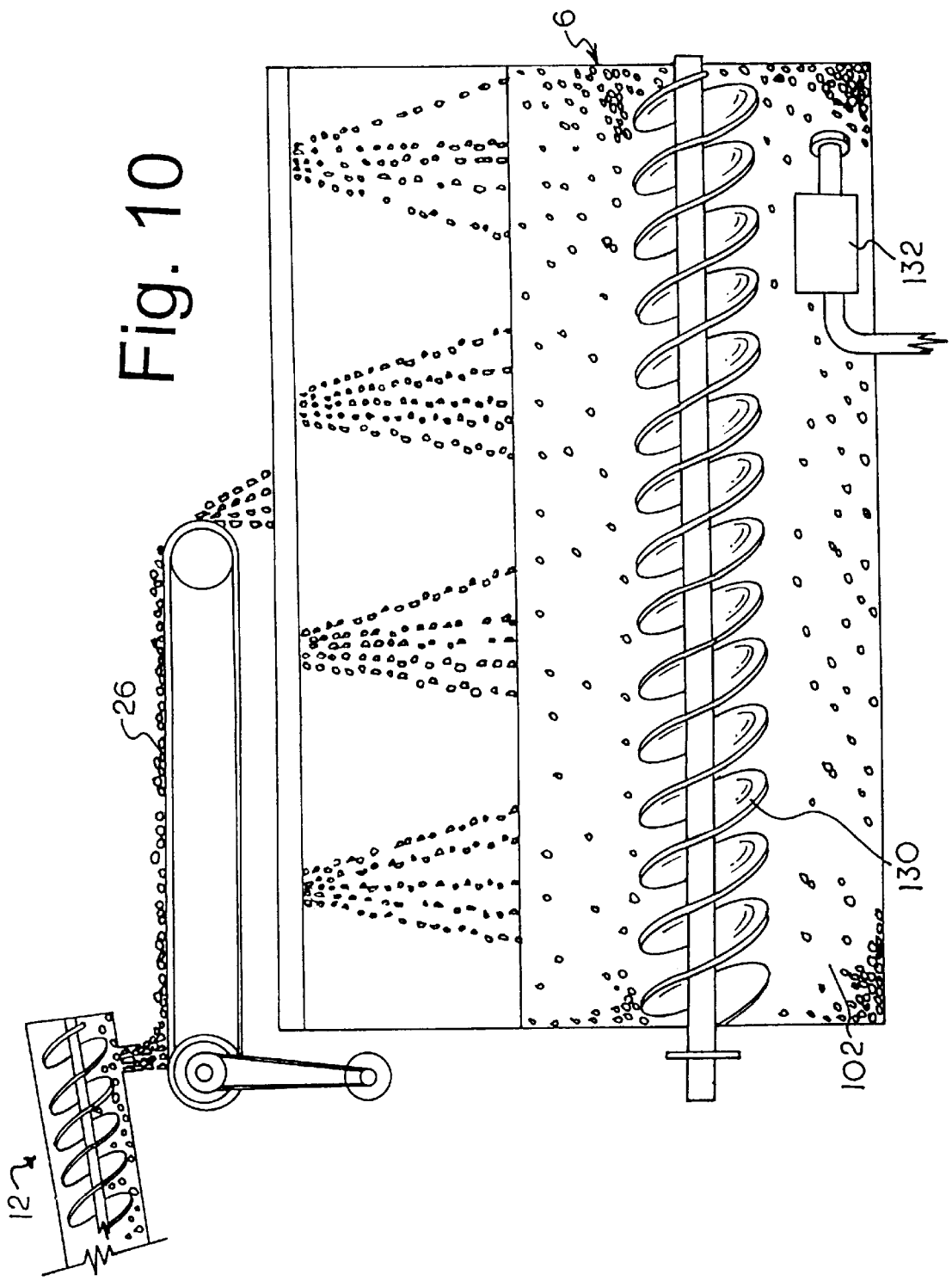
FIG. 10 is a side elevational view of an alternative version of the mixing/averaging tank.

Alternatively, as seen in FIG. 10, the mixing and averaging means within the tank 6 may comprise a single or side by side multiple conventional unidirectional augers 130, which when rotated mix and shear the slurry and propel it towards an end of the of tank. The resulting slurry is withdrawn from the tank through a single outlet 132.

The various hoses, pipes, conduits and pumps that deliver carrier liquid and hydraulic fluid to the apparatus are not shown.

Figure 7:
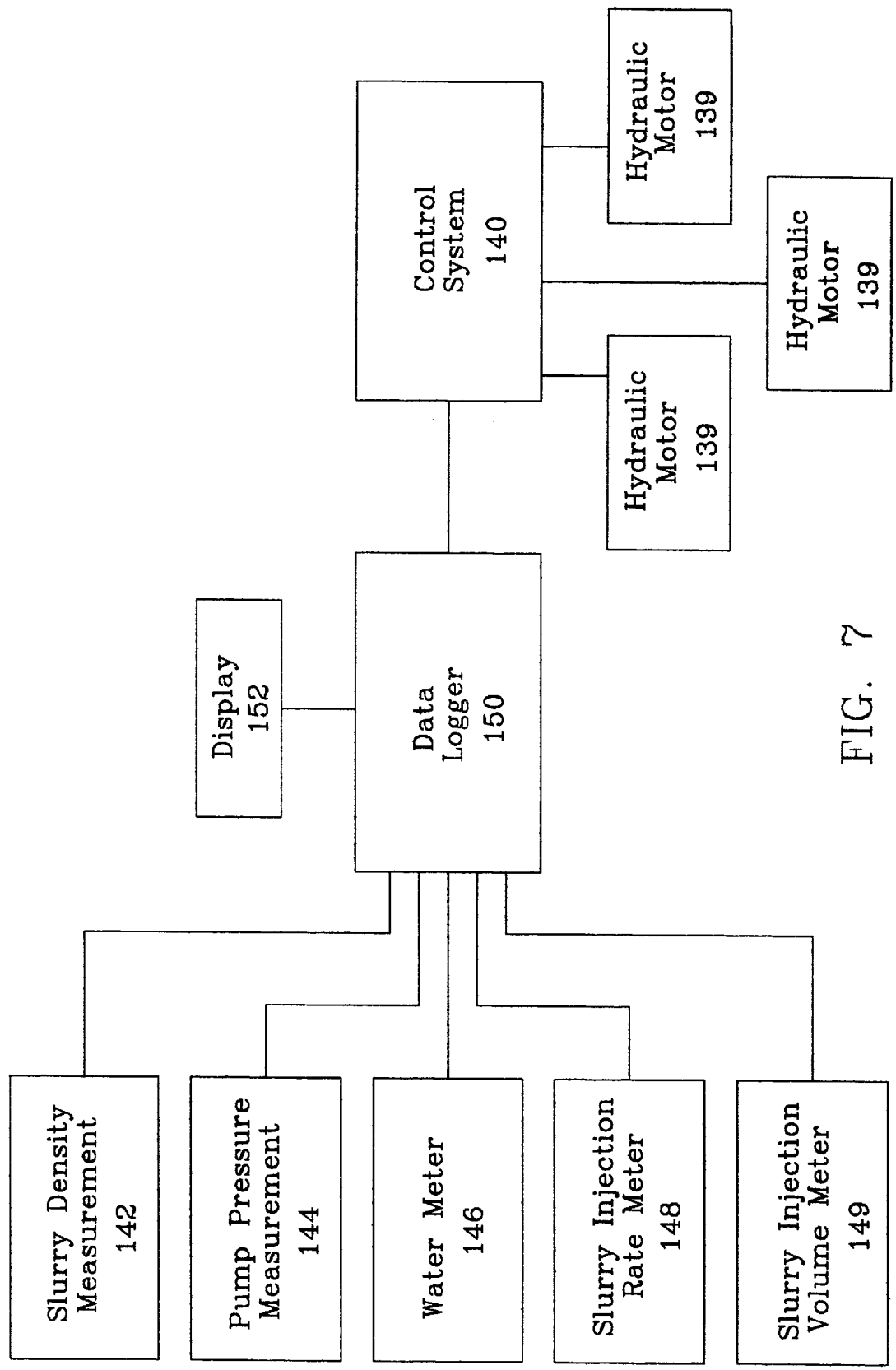
FIG. 7 is a schematic view of the control system of the present invention.

The various components of the system are driven by conventional variable speed hydraulic motors 139 (various of which are shown schematically in FIG. 7). These pumps in turn are linked to a control system 140, which permits control over the inputs into the slurry-production means and over the slurry design. Where the apparatus is used in association with a waste-injection system, the control system, shown schematically in FIG. 7, receives input from a real-time monitoring system that monitors, records and visually displays the parameters of slurry density, injection rate, surface injection and well-bottom pressures, injected volumes and slurry solids concentration. The monitoring system consists of:

slurry density measuring means 142;

pump pressure measuring means 144;

means 146 to measure water input into the system;

means 148 to measure slurry uptake rates, such as injection rates into a well;

means 149 to measure slurry volumes being injected;

a control data logger 150 linked to all of the measuring means to record and store the data in real time. A digital display 152 is provided in the data logger.

The control means is adapted to maintain a consistent slurry density and delivery rate and pressure, through conventional feedback means.

The present invention has been described by way of a specific embodiment thereof. It will, however, be understood by those skilled in the art to which this invention pertains that numerous departures from and variations to this invention may be made, while remaining within the spirit and scope of the invention as defined in the appended claims.

We claim:

1. Apparatus for the generally continuous formation of a slurry from particulates and carrier liquid, said apparatus comprising:

a) receiving means to receive sold material in particulate form;

b) a transport assembly having first and second ends, said first end positioned to receive said particulate substrate from said receiving means, said assembly having at least one liquid carrier inlet to introduce a carrier liquid into said assembly separately from said particulates; and means to mix together said liquid and particulate substrate into a mixture and transport said mixture to a second end of said assembly;

c) a mixing tank adapted to receive said mixture from said second end of said transport assembly, said tank having at least one liquid intake means to introduce a measured amount of additional carrier liquid into said tank, and mixing and shearing means to form a slurry from said carrier liquid and said additional carrier liquid, said mixing and shearing means comprising at least one rotatably driven auger for mixing and shearing said mixture to form a slurry on a continual basis having a selected solids compositions and density and at least one outlet to discharge said slurry on a continuous basis.

2. Apparatus as in claim 1, wherein said transport assembly comprises an auger housed within an auger housing, and means to rotatably drive said auger within said housing.

3. Apparatus as in claim 2, wherein said auger comprises first and second portions, said first portion facing said first end and said second portion facing said second end, said first portion comprising a double flighting and said second portion comprising a single flighting.

4. Apparatus as claimed in claim 2, wherein said transport assembly comprises an array of multiple rotatable augers each housed within a corresponding housing, said housings being arranged in a stepwise interconnected array.

5. Apparatus as in claim 1, wherein said transport assembly is provided with a second inlet to admit additional substrate material in liquid form into said assembly for incorporation within said mixture.

6. Apparatus as in claim 1, wherein there is further provided a particle sizing means for the removal of particles having a size greater than a pre-selected size from said substrate, said particle sizing means comprising a screen deck engaged to a motion generator means to move said screen, and carrying means to transport said substrate from said particle sizing means to said mixing tank.

7. Apparatus as in claim 6, wherein said transport assembly comprises said carrying means.

8. Apparatus as in claim 7, wherein there is further provided a second of said transport/mixing assemblies to carry said substrate from said receiving means to said particle sizing means.

9. Apparatus as in claim 8, wherein said second transport assembly comprises an auger housed within an auger housing, and means to rotatably drive said auger within said housing.

10. Apparatus as in claim 9, wherein said auger comprises first and second portions, said first portion facing said first end and said second portion facing said second end, said first portion comprising a double flighting and said second portion comprising a single flighting.

11. Apparatus as in claim 8, wherein said second transport assembly comprises an array of multiple rotatable augers each housed within a corresponding housing, said housings being arranged in a stepwise interconnected array.

12. Apparatus as claimed in claim 6 wherein a spray means is provided to spray additional carrier liquid onto said particulates as they are deposited on said screen deck.

13. Apparatus as in claim 12, wherein said screen deck comprises at least two spaced apart screens each having a generally horizontal upper surface and retained on parallel planes within a housing, and said spray means comprises an array of spray outlets adapted to spray carrier liquid onto the upper surface of each of said screens.

14. Apparatus as in claim 6, wherein said screen deck is housed within a screen housing, and said motion generator means comprises a motor-driven eccentric cam mounted to said housing and adapted to move said housing upon rotation of said cam.

15. Apparatus as in claim 14, wherein said housing is supported by one or more springs.

16. Apparatus as in claim 1, wherein said first transport assembly comprises means to transport said solid material by entraining said material within a pressurized stream of carrier fluid and discharging said fluid through an elongate tube, said assembly comprising:
 a) an elongate tube having first and second ends, said first end comprising an inlet and said second end comprising an outlet;
 b) a chamber to receive said carrier fluid and said solid material, said chamber having an outlet to deliver said carrier liquid and said solid material to said first end of said tube in the form of a carrier fluid/solid mixture;
 c) a fluid delivery conduit to deliver a carrier fluid to said chamber; and
 d) pressurizing means to pressurize said carrier fluid sufficient to drive said carrier fluid/solid mixture the length of said tube.

17. Apparatus as in claim 16, wherein said fluid delivery conduit incorporates a narrowed section and a second conduit entering said delivery conduit at said narrowed section for the introduction of said solid material into said carrier fluid, said narrowed section adapted to generate a Bernoulli effect within said carrier fluid to draw said solid material into said carrier fluid.

18. Apparatus as in claim 1, wherein said mixing/shearing means comprises an auger rotatably disposed within said mixing tank, and drive means to rotate said auger.

19. Apparatus as in claim 18, wherein said auger is characterized by first and second flightings meeting at generally the midpoint of said auger, with said first and second flightings being canted in opposing directions so as to push said slurry towards opposing sides of said tank when said auger is rotated.

20. Apparatus as in claim 19, wherein said tank is provided with dual slurry discharge outlets at opposing ends of said tank.

21. Apparatus as in claim 1, wherein said mixing tank is provided with a spray bar extending at least partly along an upper rim of said tank for the admission of additional carrier liquid into said tank.

22. A method for the generally continuous creation of a particulate/liquid slurry, comprising the steps of:
 a) delivering solid material in particulate form to a mixing transport assembly, said assembly comprising: receiving means to receive solid material in particulate form; at least one liquid intake means separate from said receiving means to introduce a carrier liquid into said assembly and mixing transport means to mix together said liquid and solid material into a mixture and transport said mixture to a second end of said assembly;
 b) adding a carrier liquid to the material within the transport assembly after said material has been introduced into said assembly;
 c) performing a preliminary mixing of the solids and liquid within the transport assembly, while transporting the mixture to a mixing tank;
 d) delivering said mixture to a mixing tank, said tank incorporating mixing and shearing means;
 e) delivering a measured and controlled amount of additional carrier liquid into said tank and combining said additional liquid with said mixture within said tank to form a slurry by mixing and shearing said mixture, to form a slurry having a predetermined solids concentration and density;
 f) removing said slurry from said tank on a generally continuous basis.

23. A method as claimed in claim 22, characterized by the further steps of delivering said solid material to a particle sizing means comprising a screen deck engaged to a motion-generator means to move said screen deck; shaking or vibrating said screen deck to remove oversized particles from said mixture; delivering additional carrier liquid to said mixture at said screen deck; and delivering said mixture from said particle sizing means to said mixing tank by means of said mixing/transport assembly.

24. A method as in claim 23, wherein said screen deck is comprised of multiple spaced apart screens each having a generally horizontal upper surface, and comprising the further step of directing a spray of carrier liquid onto the upper surface of each of said screens.

25. A method as in claim 22, wherein comprising the further steps of carrying said solid material to particle sizing means by means of a second of said mixing/transport assemblies; introducing carrier liquid into said second mixing/transport assembly; and performing a preliminary mixing operation within said second transport assembly wherein said solid material is mixed with said carrier liquid to form a mixture, as said mixture is transported from a first end of said second assembly to a second end.

26. A method as in claim 22, wherein said transport assembly comprises an auger rotatably housed within an elongate tubular housing, said housing having an opening adjacent to either end thereof for the introduction and discharge, respectively, of material at first and second ends respectively of said housing and said step of mixing and transporting said material and carrier liquid is performed by rotation of said auger.

27. A method as in claim 26, wherein said carrier liquid is introduced into said housing generally adjacent said second end of said housing, and said auger comprises a double flighting at a region thereof adjacent said first end of said housing and a single flighting at a region thereof adjacent said second end.

28. A method as in claim 22, comprising the further step of mixing and transporting said carrier liquid and solid material within said second transport assembly by entraining said solid material within a pressurized stream of carrier fluid and discharging said fluid and solid material through an elongate tube, said assembly comprising:

a) an elongate tube having first and second ends, said first end comprising an inlet and said second end comprising an outlet;
   b) a chamber to receive said carrier fluid and said solid material, said chamber having an outlet to deliver said carrier fluid and said solid material to said first end of said tube in the form of a carrier fluid/solid mixture;
   c) a fluid delivery conduit to deliver a carrier fluid to said chamber; and
   d) pressurizing means to pressurize said carrier fluid with sufficient pressure to propel said mixture the length of said tube.

29. A method as in claim 28, wherein said solid material is drawn into said carrier liquid by means of a Bernoulli effect within said carrier liquid generated by a narrowed section within said fluid delivery conduit, and wherein a second conduit enters said delivery conduit at said narrowed section for the introduction of said solid material into said carrier fluid, said narrowed section adapted to generate a Bernoulli effect within said carrier fluid to draw said solid material into said carrier fluid.

30. A method as in claim 22, wherein said transport assembly comprises a multistage auger assembly, said assembly comprising two or more auger stages, each of said stages comprising an auger housed within an auger housing in an elongate interconnecting stepwise arrangement and said step of mixing and transporting said mixture and carrier liquid is performed serially within said auger stages.

31. A method as in claim 25, wherein said second transport assembly comprises a multistage auger assembly, said assembly comprising two or more auger stages, each of said stages comprising an auger housed within an auger housing in an elongate interconnecting stepwise arrangement and said step of mixing and transporting said mixture and carrier liquid is performed serially within said auger stages.

32. A method as in claim 22 wherein said mixture is mixed and sheared within said mixing tank by means of an auger rotatably disposed within said mixing/averaging tank adjacent the base thereof.

33. A method as in claim 32, wherein said mixture is directed towards opposing ends of said tank by means of a said auger comprising a bi-directional auger, wherein said auger is characterized by first and second flightings meeting at generally the midpoint of said auger and being canted in opposing directions, said first and second flightings adapted to propel said mixture to opposite sides of said tank as said auger is rotated.

34. A method as in claim 32, comprising the additional step of introducing additional carrier liquid into said mixing/averaging tank by means of spraying said carrier liquid onto the slurry surface within said tank.

\* \* \* \* \*